United States Patent
Furukawa

(10) Patent No.: US 7,240,195 B2
(45) Date of Patent: Jul. 3, 2007

(54) CERTIFIED SHUFFLE-DECRYPTING SYSTEM, CERTIFIED SHUFFLE-DECRYPTING METHOD AND CERTIFIED SHUFFLE-DECRYPTION VERIFYING METHOD

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 759 days.

(21) Appl. No.: 10/137,407

(22) Filed: May 3, 2002

(65) Prior Publication Data

US 2002/0181702 A1    Dec. 5, 2002

(30) Foreign Application Priority Data

May 18, 2001   (JP)   ............................. 2001-149331

(51) Int. Cl.
*H04L 9/00*    (2006.01)
(52) U.S. Cl. ........................... 713/156; 380/28; 380/42
(58) Field of Classification Search ................. 380/30, 380/237, 28; 705/12; 713/168, 201, 180, 713/156
See application file for complete search history.

(56) References Cited

U.S. PATENT DOCUMENTS

| | | | | |
|---|---|---|---|---|
| 5,682,430 A * | 10/1997 | Kilian et al. | ................... | 380/30 |
| 5,930,365 A | 7/1999 | Nakamura | | |
| 6,092,051 A * | 7/2000 | Kilian et al. | ................... | 705/12 |
| 6,209,091 B1 * | 3/2001 | Sudia et al. | ................ | 713/175 |
| 6,317,833 B1 * | 11/2001 | Jakobsson | ................... | 713/181 |
| 6,654,883 B1 * | 11/2003 | Tatebayashi | ................ | 713/168 |
| 6,937,728 B1 * | 8/2005 | Abe et al. | ................... | 380/237 |
| 2001/0024501 A1 | 9/2001 | Furukawa | | |
| 2002/0007457 A1 * | 1/2002 | Neff | ........................... | 713/180 |
| 2004/0114763 A1 * | 6/2004 | Sako et al. | ................. | 380/277 |
| 2005/0028009 A1 * | 2/2005 | Neff | ........................... | 713/201 |

FOREIGN PATENT DOCUMENTS

| | | |
|---|---|---|
| EP | 0 723 349 A2 | 7/1996 |
| JP | 8-263575 A | 10/1996 |
| JP | 8-315053 A | 11/1996 |

(Continued)

OTHER PUBLICATIONS

Masayuki Abe; "Mix-Networks on Permutation Networks"; ASIACRYPT'99, LNCS 1716, 1999; pp. 258-273.

(Continued)

*Primary Examiner*—Nasser Moazzami
*Assistant Examiner*—Fikremariam Yalew
(74) *Attorney, Agent, or Firm*—Sughrue Mion, PLLC

(57) ABSTRACT

The present invention provides a certified shuffle-decrypting system, which does not require shuffled encrypted texts to be output, and in which the amounts of calculation and certificates are minimized to allow efficient processing, and the certified shuffle-decrypting system generates shuffle-decryption certificates certifying that multiple encrypted texts have been shuffle-decrypted correctly, and verifies, based on the shuffle-decryption certificates, whether or not the shuffle-decryption has taken place correctly. This system comprises: a certified shuffle-decryption device for shuffle-decrypting the multiple encrypted texts to generate the shuffle-decrypted texts, and for generating the shuffle-decryption certificates; and a shuffle-decryption verification device for verifying whether or not the shuffle-decryption has taken place correctly, by referring to the generated shuffle-decrypted texts and the shuffle-decryption certificates for the shuffle-decrypted texts.

12 Claims, 8 Drawing Sheets

FOREIGN PATENT DOCUMENTS

| | | |
|---|---|---|
| JP | 9-288658 A | 11/1997 |
| JP | 10-74045 A | 3/1998 |
| JP | 2773737 B2 | 4/1998 |
| JP | 11-143359 A | 5/1999 |
| JP | 3003771 B2 | 11/1999 |
| JP | 11-338346 A | 12/1999 |
| JP | 2000-250408 A | 9/2000 |
| JP | 2001-217824 A | 8/2001 |
| JP | 2001-251289 A | 9/2001 |

OTHER PUBLICATIONS

Encryption and Information Security Symposium, Institute of Electronics, Information and Communication Engineers Information Security Technical Group, Jan. 23, 2001, vol. 11, p. 855-890.

* cited by examiner

CERTIFIED SHUFFLE-DECRYPTING SYSTEM, CERTIFIED SHUFFLE-DECRYPTING METHOD AND CERTIFIED SHUFFLE-DECRYPTION VERIFYING METHOD

FIELD OF THE INVENTION

The present invention relates to a certified shuffle-decrypting system, a certified shuffle-decrypting method and a certified shuffle-decryption verifying method, for performing certified shuffling and certified decryption which are employed, for example, in configurations such as an anonymous communication channel.

BACKGROUND OF THE INVENTION

[Conventional Certified Shuffling]

A conventional certified shuffling technique is described, for example, in Japanese Patent Application No. 2000-059091 (Japanese Patent Laid-Open Application No. 2001-251289) (hereinafter, referred to as "Document 1").

FIG. 6 is a block diagram showing a configuration of the conventional technique described in Document 1. In each of the accompanying drawings, a joining arrow means that pieces of information at the roots of the arrow are sent together to the tip of the joining arrow, while a branched arrow means that at least part of the information at the root of the arrow is sent to the tips of the branched arrow.

The term "shuffling" used herein is referred to as "re-encryption shuffling" in Document 1. Herein, "shuffling" means to shuffle the order of the input encrypted texts and to re-encrypt them.

Referring to FIG. 6, first, encrypted texts/public keys 100 are input to be shuffled at the shuffling step 101. At this point, the input encrypted texts and shuffling information 102 specifying the shuffling are sent to the identical conversion certifying step 103 as well as to the substitution certifying step 104. The identical conversion certifying step 103 generates and outputs identical conversion certificates 105, and sends random numbers 106 used for generating the certificates 105 to the substitution certifying step 104. The substitution certifying step 104 outputs substitution certificates 107. The identical conversion certificates 105, the substitution certificates 107, the encrypted texts/public keys 100, and shuffled encrypted texts 109 are input to the response generating step 108, where responses are added to the identical conversion certificates 105, the substitution certificates 107 and the encrypted texts to generate and output shuffling certificates 110.

The identical conversion certificates 105 together with the responses prove that they have the knowledge of the order of the shuffled input texts and the content of conversion for encryption, and, when the input encrypted texts each contain multiple integer elements, prove that the elements of each encrypted text are shuffled in the same order and received are subjected to corresponding encryption. The substitution certificates 107 together with the responses prove that the shuffling order of the input encrypted texts is correct.

In order to prove that this shuffling process is correct, two certificating steps, namely the identical conversion certificating step and the substitution certificating step, are employed in Document 1. Document 1 achieves efficient generation of shuffling certificates by separating the processed subjects of the certifying step.

[Conventional Certified Decryption]

A conventional technique for certified decryption is disclosed, for example, in Japanese Patent Application No. 08-263575 (Japanese Patent No. 3003771) (hereinafter, referred to as "Document 2").

FIG. 7 is a block diagram showing a configuration of the conventional technique disclosed in Document 2. Referring to FIG. 7, shuffled encrypted texts 200 and secret keys 201 are first input into the decrypting step 203 for decryption. Then, the input shuffled encrypted texts 200, the secret keys 201 and the decrypted texts 204 are sent to the decryption certifying step 205. Based on these information, the decryption certifying step 205 outputs decryption certificates 206.

Herein, "decryption" means to partially decrypt the encrypted texts by using at least one of the secret keys that are kept separately from each other. By repeating such partial decryption by using all of the secret keys, the encrypted texts can be decrypted completely.

[Certified Shuffle-decrypting Method]

The certified shuffling technique of Document 1 and the certified decrypting technique of Document 2 can be combined to obtain a certified shuffle-decrypting method.

FIG. 8 is a block diagram for illustrating the certified shuffle-decrypting method by simply combining the techniques of Documents 1 and 2. This method is characterized in that shuffled encrypted texts 304 are contained in shuffle-decryption certificates 316, that the shuffled encrypted texts 304 are input into decryption certifying step 314 and that no data is transformed from the response generating step to the decryption certifying step.

However, this technique has the following problems.

Assume a system in which the encrypted texts are input to be shuffled and decrypted to give decrypted texts, and then validation certificates for the shuffling/decrypting process are generated and output. Although an anonymous communication channel can be configured by combining the techniques of Documents 1 and 2 as described above, this method requires unnecessary shuffled encrypted texts to be output to prove validation. When there are a number of encrypted texts, outputting unnecessary shuffled encrypted texts adversely increases the amount of certificates and deteriorates communication efficiency.

According to the technique of Document 2, modular exponentiations accompanied by a large amount of calculation proportional to the number of the encrypted texts have to be carried out for generating the certificates. This adversely affects efficiency of the shuffle-decryption.

In view of the drawbacks of the above-described techniques, a first objective of the present invention is to combine the techniques of Documents 1 and 2 to provide a certified shuffle-decrypting system, a certified shuffle-decrypting method and a shuffle-decryption verifying method, which are efficient since there is no need of outputting shuffled encrypted texts and thus an amount of calculation as well as an amount of certificates are minimized.

In view of the drawbacks of the above-described techniques, a second objective of the present invention is to provide a certified shuffle-decrypting system, a certified shuffle-decrypting method, which can realize further high-speed processing by greatly decreasing the number of modular exponentiations and an amount of calculation.

SUMMARY OF THE INVENTION

In order to achieve the above-described objectives, one aspect of the present invention is a certified shuffle-decryption device of the invention for shuffle-decrypting multiple encrypted texts. to generate shuffle-decrypted texts and for generating shuffle-decryption certificates for certifying that the shuffle-decryption has correctly taken place, in which: the order of the encrypted texts is shuffled and encrypted with public keys to obtain shuffled encrypted texts, which are then decrypted with secret keys to obtain the shuffle-decrypted texts; responses are generated as references for certifications; based on the responses, certificates certifying validity of the shuffling of order, the encryption and the decryption for obtaining the shuffle-decrypted texts are generated; and the generated certificates and the response are output as shuffle-decryption certificates.

Moreover, the certified shuffle-decryption device of the present invention comprises: a shuffling unit into which the multiple encrypted texts and the public keys are input and which shuffles the order of the multiple encrypted texts and encrypts them with the public keys, thereby generating multiple shuffled encrypted texts; a decrypting unit into which the multiple shuffled encrypted texts and the secret keys are input and which decrypts the shuffled encrypted texts with the secrete keys, thereby generating multiple shuffle-decrypted texts; and a certifying unit into which the multiple encrypted texts, the public keys and the secret keys are input and which generates the shuffle-decryption certificates.

Moreover, in the certified shuffle-decryption device of the present invention, the certifying unit comprises: an identical conversion certifying unit for generating a certificate certifying that it knows the ordering relationship among the encrypted texts before and after the shuffling as well as random numbers used for encryption are known, and, when each of the input encrypted texts consists of multiple integer elements, that it knows that the elements of each encrypted text have been shuffled in the same order with the same random numbers; a substitution certifying unit for generating a certificate certifying that the input encrypted texts have been correctly shuffled; a response generating unit for generating responses for the identical conversion certifying unit and the substitution certifying unit; and a decryption certifying unit for generating, based on the responses, a certificate certifying that the shuffle-decrypted texts are obtained through correct decryption of the shuffled encrypted texts using the secret keys. All of the certificates generated by the identical conversion certifying unit, the substitution certifying unit and the decryption certifying unit as well as the responses generated by the response generating unit are output as the shuffle-decryption certificates.

Another aspect of the invention is a shuffle-decryption verification device, of the present invention, for verifying whether or not shuffle-decryption of multiple encrypted texts has taken place correctly by referring to shuffle-decryption certificates certifying that the shuffle-decryption has taken place correctly, where the shuffle-decryption certificates comprise: responses as references upon certification; and certificates, generated based on the responses, certifying that the shuffled encrypted texts, obtained by shuffling the order of the encrypted texts and encrypting them with public keys, have correctly been decrypted with the secret keys to give the shuffle-decrypted texts.

Moreover, the shuffle-decryption verification device of the invention comprises: an identical conversion verifying unit into which the shuffle-decryption certificates, the encrypted texts, the public keys and the shuffle-decrypted texts are input, and which verifies whether or not a generator of the certificates has information of the shuffling order and the content of conversion of the encrypted texts, generates challenge values, and, when each of the input encrypted texts consists of a plurality of integer elements, verifies whether or not the elements of each encrypted text have been shuffled in the same order and converted with the same random numbers so as the whole conversion to encryptions; a substitution verifying unit into which the shuffle-decryption certificates and the challenge values generated by the identical conversion verifying unit are input, and which verifies whether or not the encrypted texts has been correctly shuffled; and a decryption verifying unit into which the shuffle-decryption certificates and the challenge values generated by the identical conversion verifying unit are input, and which verifies whether or not the shuffled encrypted texts have been correctly decrypted using the secret keys to give shuffle-decrypted texts. Only when judged "valid" in all of the identical conversion verifying unit, the substitution verifying unit and the decryption verifying unit, the encrypted texts are judged to have been shuffle-decrypted correctly.

Yet another aspect of the invention is a certified shuffle-decrypting method of the invention for shuffle-decrypting multiple encrypted texts to generate shuffle-decrypted texts and for generating shuffle-decryption certificates for certifying that the shuffle-decryption has correctly taken place, where: the order of the encrypted texts is shuffled and encrypted with public keys to obtain shuffled encrypted texts, which are then decrypted with secret keys to obtain the shuffle-decrypted texts; responses are generated as references for certifications; based on the response, certificates certifying validity of the shuffling of order, the encryption and the decryption for obtaining the shuffle-decrypted texts are generated; and the generated certificates and the response are output as shuffle-decryption certificates.

The certified shuffle-decrypting method of the invention, comprises the steps of: based on the inputs of the multiple encrypted texts and the public keys, shuffling the order of the multiple encrypted texts and encrypting them with the public keys, thereby generating multiple shuffled encrypted texts; based on the inputs of the multiple shuffled encrypted texts and the secret keys, decrypting the shuffled encrypted texts with the secrete keys, thereby generating multiple shuffle-decrypted texts; and based on the inputs of the multiple encrypted texts, the public keys and the secret keys, generating the shuffle-decryption certificates.

In the certified shuffle-decrypting method of the present invention, the certifying step comprises: an identical conversion certifying step for generating a certificate certifying that it knows the ordering relationship among the encrypted texts before and after the shuffling as well as random numbers used for encryption are known, and, when each of the input encrypted texts consists of multiple elements, that it knows that the elements of each encrypted text have been shuffled in the same order with the same random numbers; a substitution certifying step for generating a certificate certifying that the input encrypted texts have been correctly shuffled; a response generating step for generating responses for the identical conversion certifying step and the substitution certifying step; and a decryption certifying step for generating, based on the responses, a certificate certifying that the shuffle-decrypted texts are obtained through correct decryption of the shuffled encrypted texts using the secret keys. All of the certificates generated by the identical conversion certifying step, the substitution certifying step and the decryption certifying step as well as the responses generated by the response generating step are output as the shuffle-decryption certificates.

Yet another aspect of the invention is a shuffle-decryption verifying method, for verifying whether or not shuffle-decryption of multiple encrypted texts has taken place correctly by referring to shuffle-decryption certificates certifying that the shuffle-decryption has taken place correctly, in which the shuffle-decryption certificates comprise: responses as references upon certification; and certificates, generated based on the responses, certifying that the shuffled encrypted texts, obtained by shuffling the order of the encrypted texts and encrypting them with public keys, have correctly been decrypted with the secret keys to give the shuffle-decrypted texts.

The shuffle-decryption verifying method of present invention, comprises: an identical conversion verifying step where the shuffle-decryption certificates, the encrypted texts, the public keys and the shuffle-decrypted texts are input, where it is verified whether or not a generator of the certificates has information of the shuffling order and the content of conversion of the encrypted texts, where challenge values are generated, and, when each of the input encrypted texts consists of a plurality of elements, where it is verifies whether or not the elements of each encrypted text have been shuffled in the same order and converted with the same random numbers so as the whole conversion to encryptions; a substitution verifying step where the shuffle-decryption certificates and the challenge values generated by the identical conversion verifying step are input, and where it is verified whether or not the encrypted texts has been correctly shuffled; and a decryption verifying step where the shuffle-decryption certificates and the challenge values generated by the identical conversion verifying step are input, and where it is verified whether or not the shuffled encrypted texts have been correctly decrypted using the secret keys to give shuffle-decrypted texts. Only when it is judged "valid" in all of the identical conversion verifying step, the substitution verifying step and the decryption verifying step, the encrypted texts are judged to have been shuffle-decrypted correctly.

Yet still another aspect of the invention is a certified shuffle-decrypting system, for generating shuffle-decryption certificates certifying that multiple encrypted texts have been shuffle-decrypted correctly, and for verifying, based on the shuffle-decryption certificates, whether or not the shuffle-decryption has taken place correctly, wherein the system comprises: a certified shuffle-decryption device for shuffle-decrypting the multiple encrypted texts to generate the shuffle-decrypted texts, and for generating the shuffle-decryption certificates; and a shuffle-decryption verification device for verifying whether or not the shuffle-decryption has taken place correctly, by referring to the generated shuffle-decrypted texts and the shuffle-decryption certificates for the shuffle-decrypted texts. The certified shuffle-decryption device: decrypts, with the secret keys, the shuffled encrypted texts obtained by shuffling the order of the encrypted texts and encrypting them with public keys, thereby generating the shuffle decrypted texts; generates responses as a reference for the certifications; generates certificates certifying, based on the responses, the validities of the shuffling of order, the encryption and the decryption for obtaining the shuffle-decrypted texts; and outputs the generated certificates and the responses as shuffle-decryption certificates.

In the certified shuffle-decrypting system of the present invention, the certified shuffle-decryption device comprises: a shuffling unit into which the multiple encrypted texts and the public keys are input and which shuffles the order of the multiple encrypted texts and encrypts them with the public keys, thereby generating multiple shuffled encrypted texts; a decrypting unit into which the multiple shuffled encrypted texts and the secret keys are input and which decrypts the shuffled encrypted texts with the secrete keys, thereby generating multiple shuffle-decrypted texts; and a certifying unit into which the multiple encrypted texts, the public keys and the secret keys are input and which generates the shuffle-decryption certificates.

In the certified shuffle-decrypting system of the present invention, the certifying unit of the certified shuffle-decryption device comprises: an identical conversion certifying unit for generating a certificate certifying that it knows the ordering relationship among the encrypted texts before and after the shuffling as well as random numbers used for encryption are known, and, when each of the input encrypted texts consists of multiple elements, that it knows that the elements of each encrypted text have been shuffled in the same order with the same random numbers; a substitution certifying unit for generating a certificate certifying that the input encrypted texts have been correctly shuffled; a response generating unit for generating responses for the identical conversion certifying unit and the substitution certifying unit; and a decryption certifying unit for generating, based on the responses, a certificate certifying that the shuffle-decrypted texts are obtained through correct decryption of the shuffled encrypted texts using the secret keys. All of the certificates generated by the identical conversion certifying unit, the substitution certifying unit and the decryption certifying unit as well as the responses generated by the response generating unit are output as the shuffle-decryption certificates.

In the certified shuffle-decrypting system of the present invention, the shuffle-decryption verification device comprises: an identical conversion verifying unit into which the shuffle-decryption certificates, the encrypted texts, the public keys and the shuffle-decrypted texts are input, and which verifies whether or not a generator of the certificates has information of the shuffling order and the content of conversion of the encrypted texts, generates challenge values, and, when each of the input encrypted texts consists of a plurality of elements, verifies whether or not the elements of each encrypted text have been shuffled in the same order and converted with the same random numbers so as the whole conversion to encryptions; a substitution verifying unit into which the shuffle-decryption certificates and the challenge values generated by the identical conversion verifying unit are input, and which verifies whether or not the encrypted texts has been correctly shuffled; and a decryption verifying unit into which the shuffle-decryption certificates and the challenge values generated by the identical conversion verifying unit are input, and which verifies whether or not the shuffled encrypted texts have been correctly decrypted using the secret keys to give shuffle-decrypted texts. Only when it is judged "valid" in all of the identical conversion verifying unit, the substitution verifying unit and the decryption verifying unit, the encrypted texts are judged to have been shuffle-decrypted correctly.

Yet another aspect of the invention is a computer program product for certified shuffle-decrypting, which controls a computer for shuffle-decrypting multiple encrypted texts to generate shuffle-decrypted texts and for generating shuffle-decryption certificates for certifying that the shuffle-decryption has correctly taken place, wherein: the order of the encrypted texts is shuffled and encrypted with public keys to obtain shuffled encrypted texts, which are then decrypted with secret keys to obtain the shuffle-decrypted texts; responses are generated as references for certifications; based on the response, certificates certifying validity of the shuffling of order, the encryption and the decryption for obtaining the shuffle-decrypted texts are generated; and the generated certificates and the response are output as shuffle-decryption certificates.

Yet another aspect of the invention is a computer program product for shuffle-decryption verifying, which controls a computer for verifying whether or not shuffle-decryption of multiple encrypted texts has taken place correctly by referring to shuffle-decryption certificates certifying that the shuffle-decryption has taken place correctly, wherein the shuffle-decryption certificates comprise: responses as references upon certification; and certificates, generated based on the responses, certifying that the shuffled encrypted texts, obtained by shuffling the order of the encrypted texts and encrypting them with public keys, have correctly been decrypted with the secret keys to give the shuffle-decrypted texts.

DETAILED DESCRIPTION OF THE INVENTION

Hereinafter, embodiments of the present invention will be described in detail with reference to the drawings.

[Certified Shuffle-Decrypting Method]

According to a certified shuffle-decryption technique of the present invention, first, encrypted texts, public keys and secret keys are input. Based on the encrypted texts and the public keys, shuffled encrypted texts are generated. Then, the shuffled encrypted texts are decrypted with the secret keys to give decrypted texts.

Next, a certified shuffling method (certified encryption shuffling method) is employed to generate the shuffled encrypted texts and shuffling certificates. The certified shuffling process may be carried out according to the conventional technique, for example, as described in Document 1. However, according to the present invention, the decrypted texts are used instead of the shuffled encrypted texts in order to generate challenge values for generating the certificates.

Then, difference of the verification results which occurs for using the decrypted texts instead of the shuffled encrypted texts upon the verification procedure is obtained and added to the shuffling certificates.

The certificates for validation of the obtained difference of the verification results are generated as decryption certificates. The shuffling certificates and the decryption certificates are added together as shuffle-decryption certificates. The decrypted texts and the shuffle-decryption certificate are output.

[Shuffle-Decryption Verifying Method]

According to the shuffle-decryption verification of the invention, first, the encrypted texts, the public keys, the decrypted texts and the shuffle-decryption certificates are input. According to the present invention, the decrypted texts are input for the verification, instead of the shuffled encrypted texts used in the shuffle verification of Document 1. Difference of verification results caused upon using the decrypted texts in place of the shuffled encrypted texts upon the verification procedure, which is included in the shuffle-decryption certificates, is used for correcting the verification equation. Subsequently, validation of the difference of the verification results is verified. When the results of both of the verifications (i.e., shuffle verification using the decrypted texts and verification of the validation of the difference of the verification results) are "valid", the verification result for the shuffle-decryption is output as "valid", otherwise output as "invalid".

Figure 1:
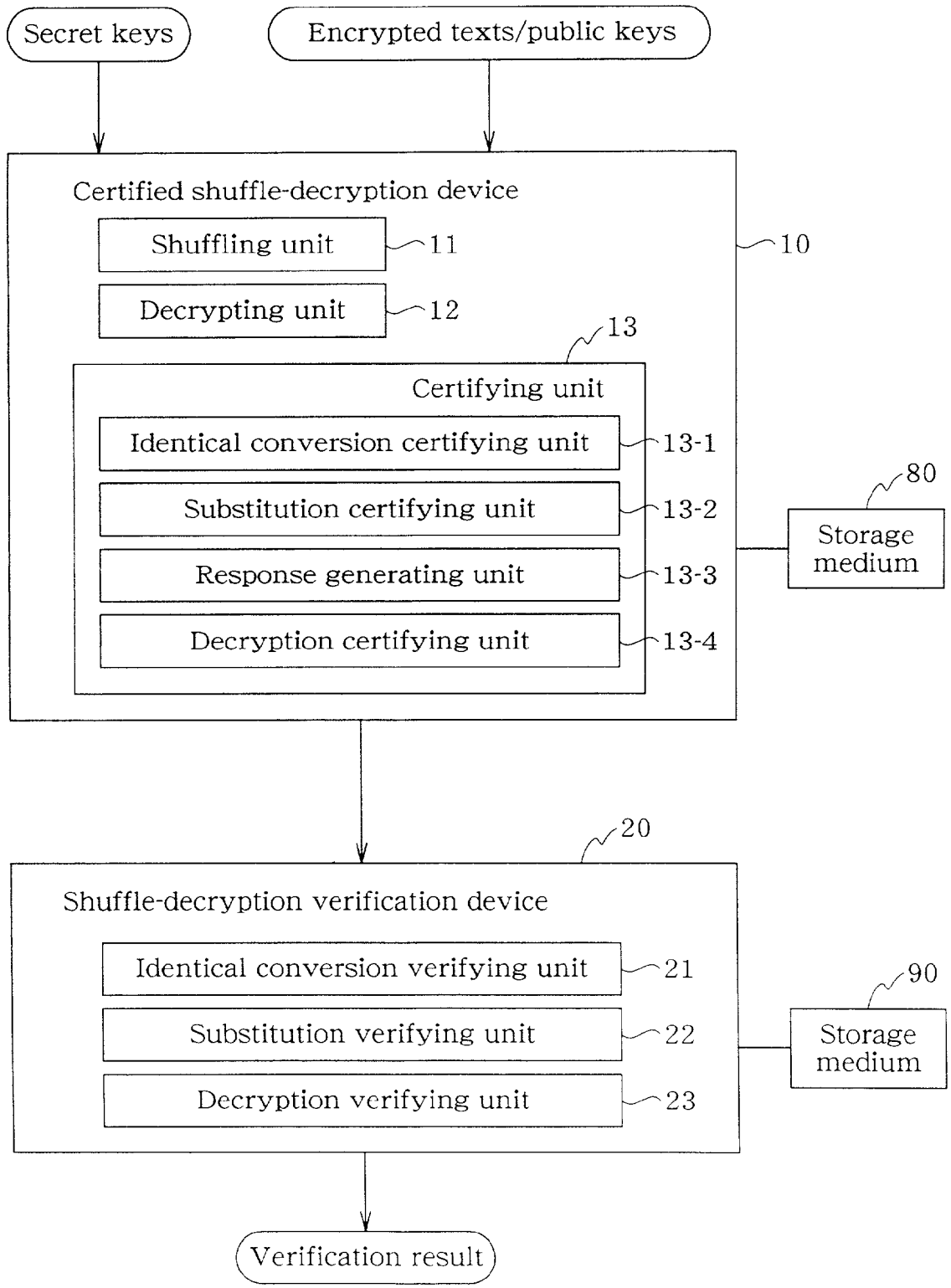
FIG. 1 is a block diagram showing a configuration of a certified shuffle-decrypting system according to one embodiment of the present invention.

FIG. 1 is a block diagram showing a configuration of a certified shuffle-decrypting system according to one embodiment of the invention. Referring to FIG. 1, the certified shuffle-decrypting system of the present embodiment is provided with a certified shuffle-decryption device 10 for generating certificates and a shuffle-decryption verification device 20 for verifying based on the certificates.

The certified shuffle-decryption device 10 is provided with a shuffling unit 11, a decrypting unit 12 and a certifying unit 13.

The shuffling unit 11 receives multiple encrypted texts and public keys, shuffles the order of the input multiple encrypted texts and encrypts the results with the public keys to give multiple shuffled encrypted texts.

The decrypting unit 12 receives the multiple shuffled encrypted texts generated by the shuffling unit 11 and secret keys, and decrypts the shuffled encrypted texts with the secret keys to generate and output multiple decrypted texts.

The certifying unit 13 generates certificates based on the multiple encrypted texts, the public keys and the secret keys. The certifying unit 13 is provided with an identical conversion certifying unit 13-1, a substitution certifying unit 13-2, a response generating unit 13-3 and a decryption certifying unit 13-4.

The identical conversion certifying unit 13-1 generates certificates which certify (which perform zero knowledge Interactive Proof) that they know the relationship of the orders before and after the shuffling by the shuffling unit 11 as well as the random numbers used for encryption. When each of the input encrypted texts consists of multiple integer elements, the identical conversion certifying unit 13-1 also generates certificates which certify that the elements of the encrypted texts are shuffled in the same order and processed with the same random number.

The substitution certifying unit 13-2 generates certificates that certify that shuffling has correctly taken place for the input encrypted texts. The response generating unit 13-3 generates responses for the identical conversion certifying unit 13-1 and the substitution certifying unit 13-2. The decryption certifying unit 13-4 generates certificate which certify that the shuffled encrypted texts have been correctly decrypted with the secret keys.

The certified shuffle-decryption device 10 outputs all of the certificates generated by the identical conversion certifying unit 13-1, the substitution certifying unit 13-2 and the decryption certifying unit 13-4 as well as the responses generated by the response generator 13-3, to give certificates for shuffle-decryption.

The shuffle-decryption verification device 20 is provided with an identical conversion verifying unit 21, a substitution verifying unit 22 and a decryption verifying unit 23.

The identical conversion verifying unit 21 accepts inputs of the shuffle-decryption certificates, the encrypted texts, the public keys and the decrypted texts to verify that the certificates contain the knowledge of the order of the shuffled input texts and the content of conversion for encryption. When each of the input encrypted texts consists of multiple elements, the identical conversion verifying unit 21 also verifies that the elements of each encrypted text are shuffled in the same order and converted with the same random numbers so as the whole conversion to encryptions. Then, the identical conversion verifying unit 21 outputs the result of the verification as "valid" or "invalid", and generates and outputs challenge values again.

The substitution verifying unit 22 receives inputs of the shuffle-decryption certificates as well as the challenge values generated by the identical conversion verifying unit 21, and verifies that the shuffling the order of the input encrypted texts has been done correctly and outputs the result as "valid" or "invalid".

The decryption verifying unit 23 receives inputs of the shuffle-decryption certificates as well as the challenge values generated by the identical conversion verifying unit 21, and verifies that the shuffled encrypted texts have been correctly decrypted with the secret keys to give decrypted texts, and outputs the result of verification as "valid" or "invalid".

When all of the verification results from the identical conversion verifying unit 21, the substitution verifying unit 22 and the decryption verifying unit 23 are "valid", the shuffle-decryption verification device 20 judges that the shuffled decrypted texts are the result of correct decryption of the input encrypted texts, and outputs a result of judgment as "valid". When at least one of the verification results is "invalid", the result of judgment is output as "invalid".

Hereinafter, the present invention will be described with reference to an example using Elgamal encryption. Followings are prior conditions of the present invention.

[Elgamal Encryption System]

Elgamal encryption system belongs to a public-key cryptosystem. First, two prime numbers p and q that satisfy the relationship $$P=kq+1$$

are determined. These prime numbers are referred to as Elgamal domain parameters. Secret keys $$x \in_R Z_q$$

are selected from elements of $Z_q$. Then, public keys $$(g_0, m_0)$$

are selected from elements of $Z^*_p$ of order q so as to satisfy the equation $$m_0 = g_0^x \bmod p$$

In order to encrypt plain texts $$P \in Z^*_p$$

which are elements of $Z^*_p$, random numbers $$s \in_R Z_q$$

are secretly generated to obtain encrypted texts as $$(G, M) = (g_0^s, m_0^s P) \bmod p$$

In order to decrypt this encrypted texts, the secret keys $$x$$

are used to calculate as $$P' = M/G^x \bmod p.$$

The decrypted texts P' correspond to the plain texts P.

Here, assume that the secret keys $$x$$

are possessed separately. In order words, x is the sum of m number of $x_j$ (j=1, ..., m) which are separately possessed, where $$x = (x_1 + \ldots + x_m) \bmod q$$

Herein, the $x_j$ (j=1, ..., m) are referred to as secret keys used for decryption.

In order to completely decrypt an encrypted text, decryption operation, in which M is successively divided by the results of the following Expression (1) calculated by using the respective secret keys for decryption, is repeated for all of $x_j$ (j=1, ..., m). However, in the present example, only one secret key for decryption is used and referred to as x'.

$$G^{x_j} \bmod p \tag{1}$$

[Encrypted Texts]

n number of encrypted texts that are input are represented by Expression 2 below. Each element of each encrypted text is the element of $Z^*_p$ of the order q.

$$(g_i, m_i) i=1, \ldots, n \tag{2}$$

[Decrypted Texts]

n number of decrypted texts that are output are represented by Expression 3 below. Each element of each decrypted text is the element of $Z^*_p$ of the order q.

$$(\tilde{g}_i, \tilde{m}_i) i=1, \ldots, n \tag{3}$$

These are the results obtained by shuffling the order of the n number of encrypted texts represented by Expression 4 below and decrypting them with the secret keys, $$(g_i, m_i) i=1, \ldots, n \tag{4}$$

[Challenge Value Generating Function]

Figure 5:
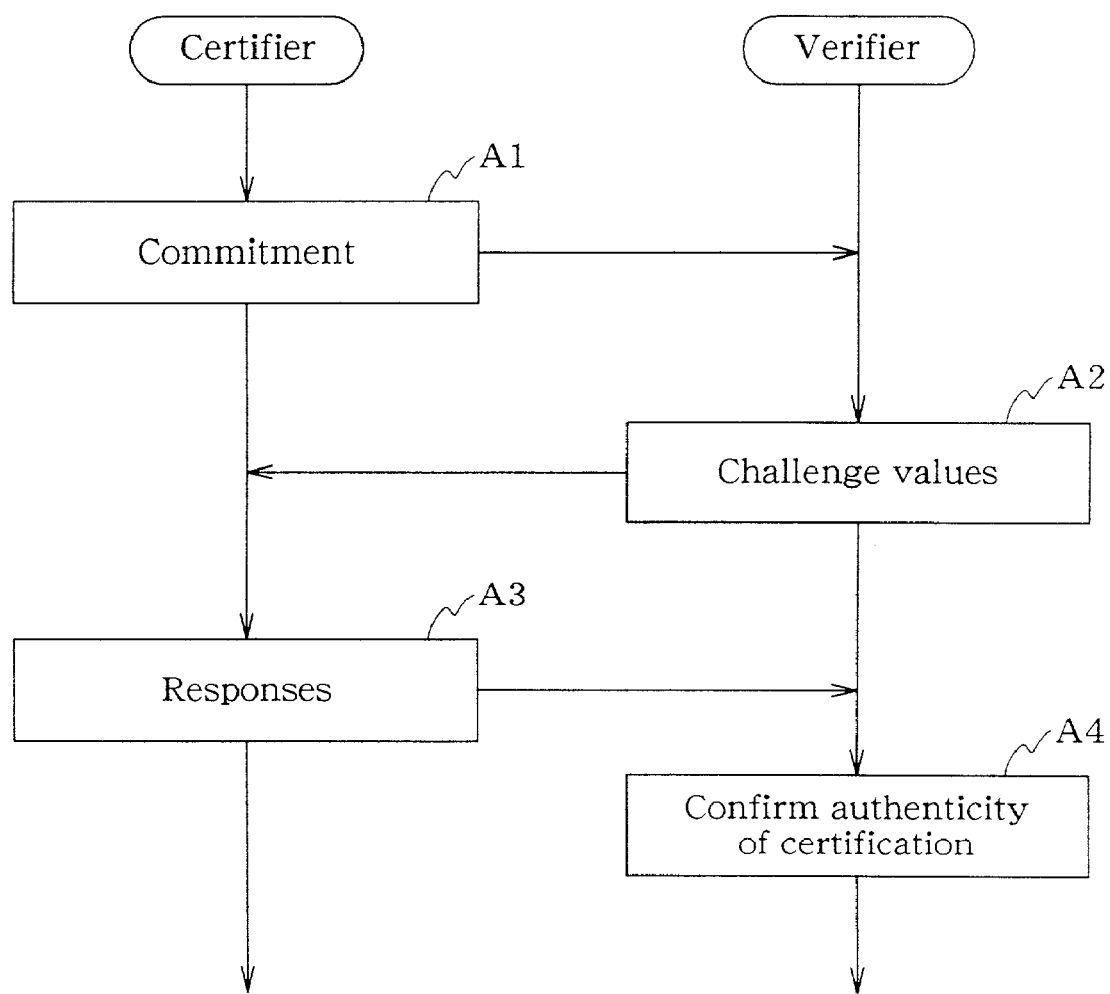
FIG. 5 is a flowchart for illustrating operations according to a conventional technique.
Figure 6:
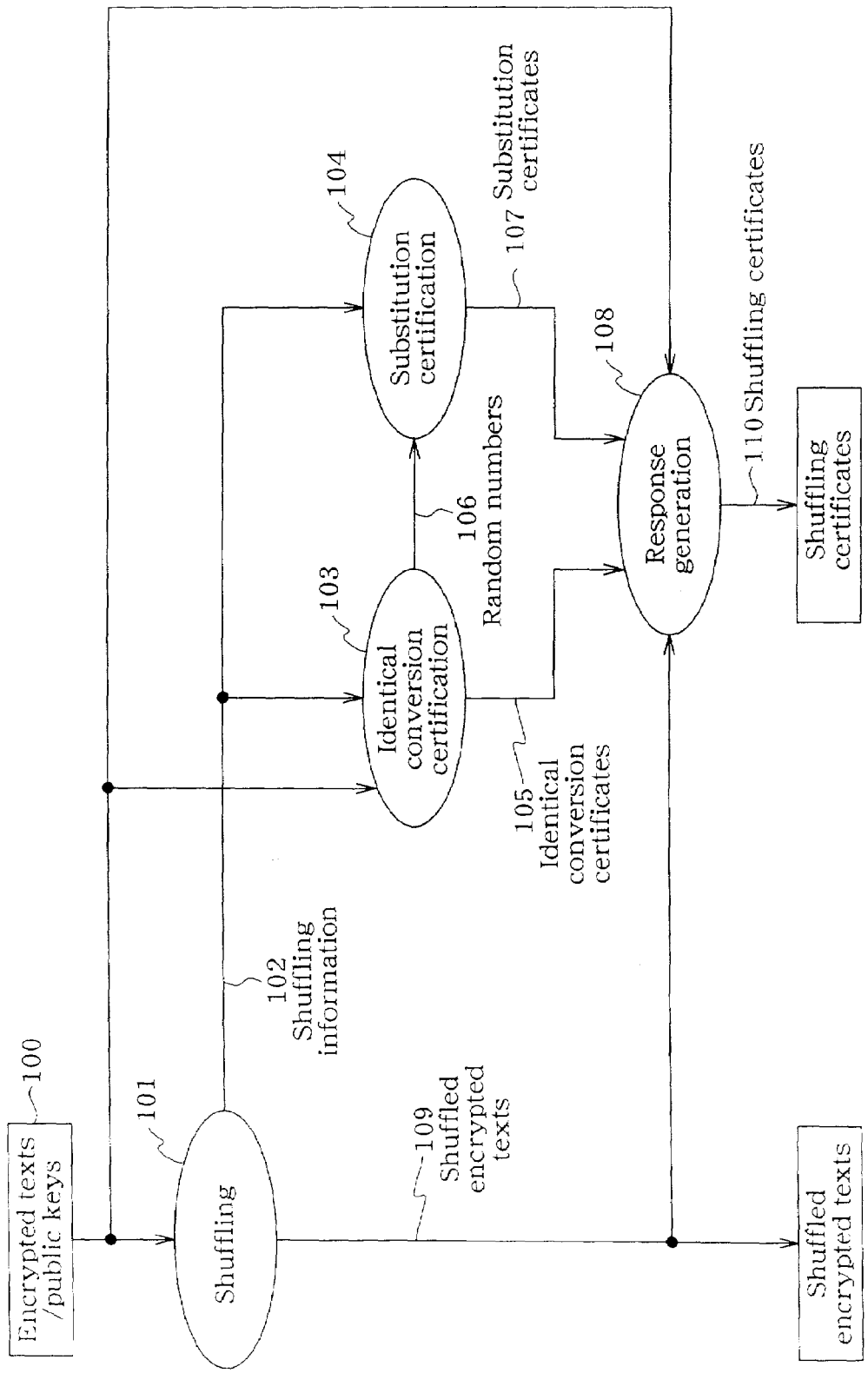
FIG. 6 is a diagram for illustrating operations of conventional certified shuffling.
Figure 7:
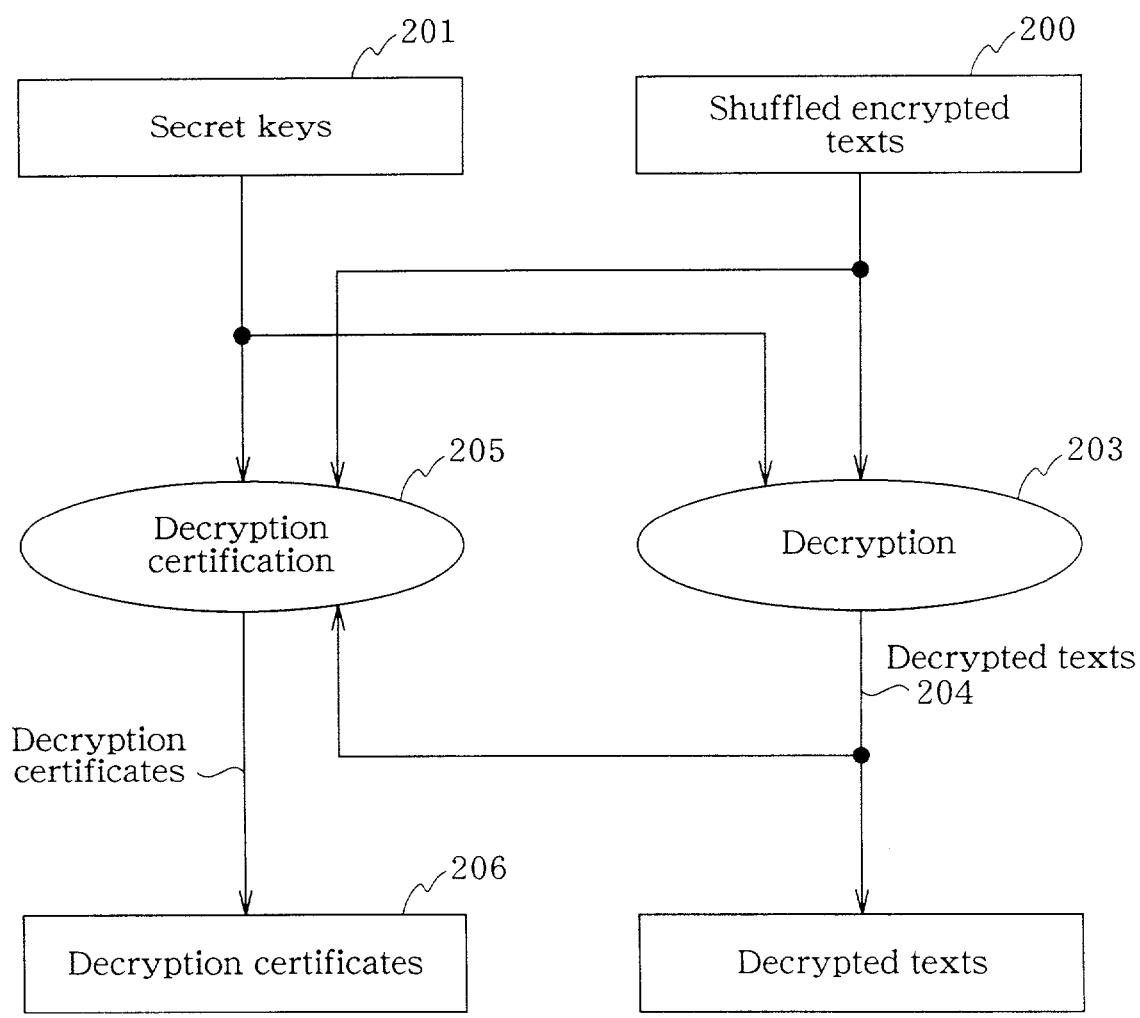
FIG. 7 is a diagram for illustrating operations of conventional certified decryption.
Figure 8:
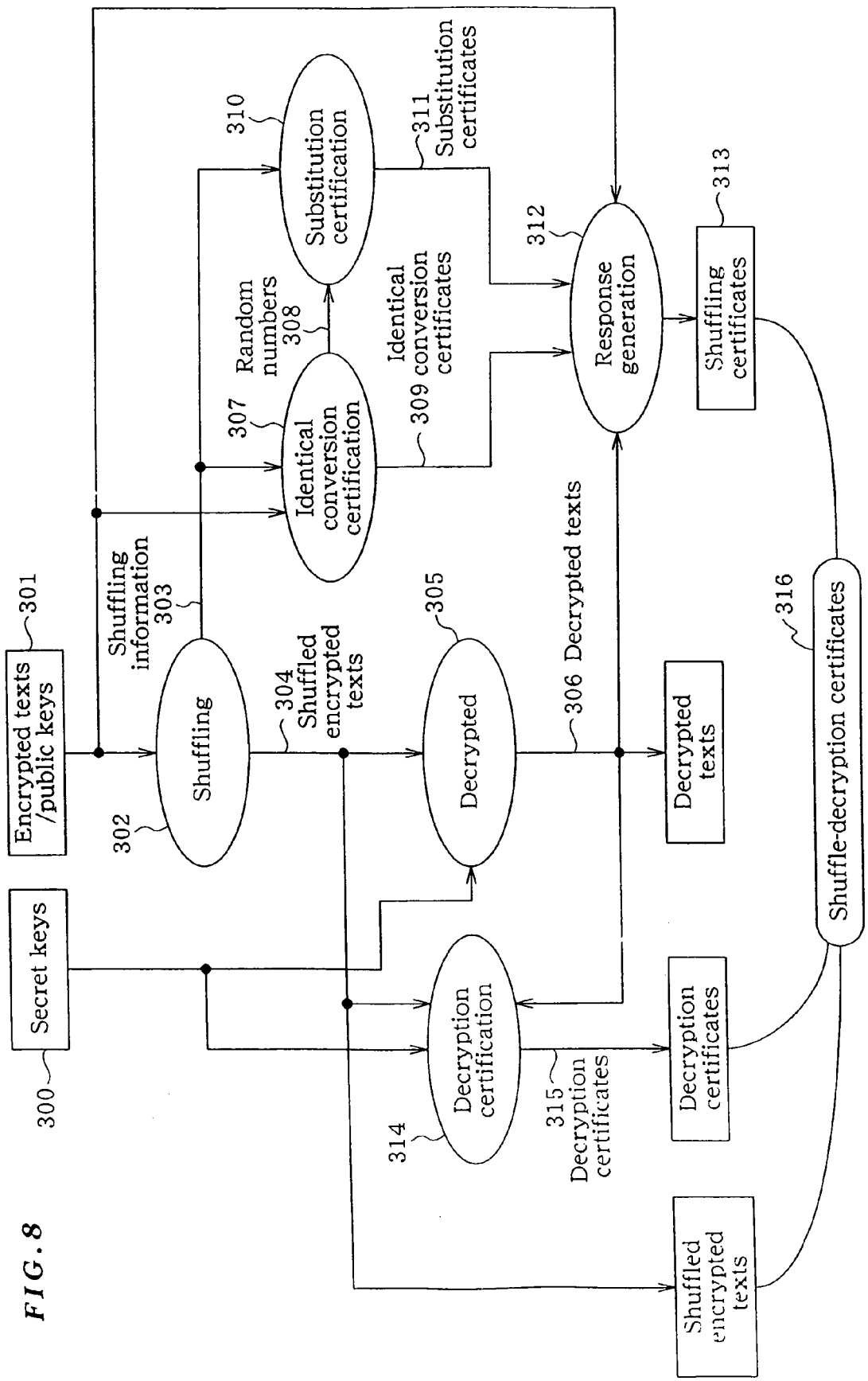
FIG. 8 is a diagram showing a configuration of a combination of the conventional techniques shown in FIGS. 6 and 7.

Hereinafter, a challenge value generating function will be described. FIG. 5 is a flowchart showing an example of an interactive certifying protocol consisting of the following four steps.

First, a certifier sends a commitment referring to a certification to a verifier (Step A1). Next, the verifier sends a challenge value to the certifier (Step A2). Then, the certifier sends a response in response to the challenge value (Step A3). The verifier confirms authenticity of the certification based on the commitment, the challenge value and the content of the response (Step A4).

In such an interactive certifying protocol, the authenticity of a certification depends on whether or not the certifier can send an appropriate response to the verifier in response to any challenge value. In Step A2, a function for generating a challenge value may be used instead of the verifier, thereby converting the above-described interactive certifying protocol to a non-interactive protocol.

Figure 2:
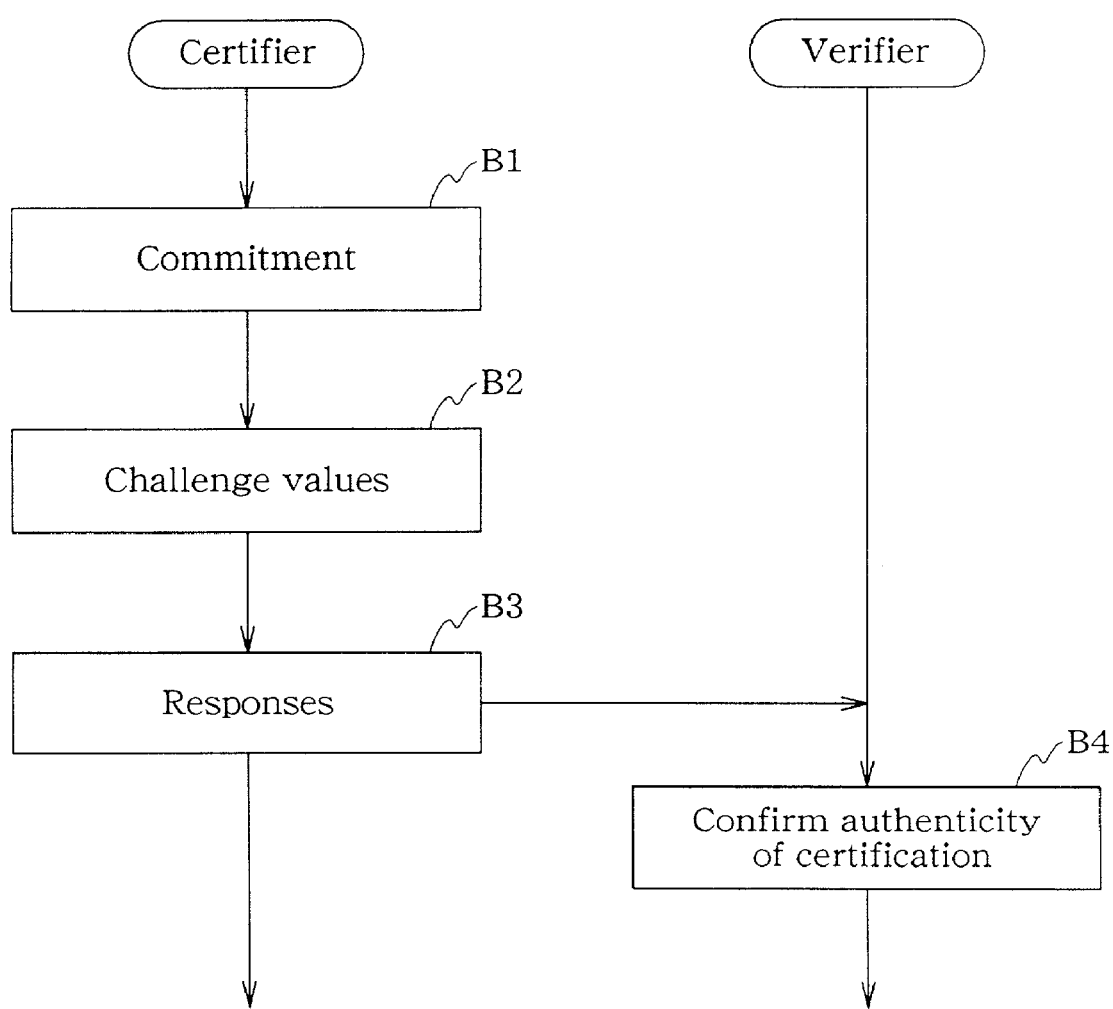
FIG. 2 is a flowchart for illustrating operations by the certified shuffle-decrypting system according to one embodiment of the present invention.

Specifically, as represented by a flowchart shown in FIG. 2, first, the certifier generates a commitment referring to a certification to the verifier (Step B1). Then, the commitment and content of the certification are input into the above-mentioned function to obtain the output as a challenge value (Step B2). The certifier generates a response to the challenge value and sends each of the generated data to the verifier (Step B3). The verifier confirms the authenticity of the certification based on the commitment, the challenge value and the content of the response (Step B4).

As described above, according to the certification protocol of the invention, the certifier can perform certification without interacting with the verifier.

The above-mentioned function for generating a challenge value is referred to as a challenge value generating function, which is expressed by the following Expression (5).

$$H_i(*) i=1, \ldots, n \tag{5}$$

The output of the challenge value generating function is n number of integers that is less than q but not "1" or "0". This function does not allow parameters to be derived intentionally through calculation with respect to the relationship between the input and output or the relationship between different components of the output.

A specific challenge value generating function may be expressed, for example, by the following Equation (6).

$$H_i(x) = \text{Hash}((\text{Hash}(x))^i \bmod q) \bmod q \tag{6}$$

[Substitution Matrix]

Hereinafter, a substitution matrix will be described. Herein, the "substitution matrix" is defined as an n×n (row×column) square matrix having a single unique component "1" on $Z_q$ in each row and each column, and other components are all "0" on $Z_q$. An exemplary matrix include the following matrix (7).

$$\begin{pmatrix} 0 & 1 & 0 & 0 \\ 0 & 0 & 0 & 1 \\ 0 & 0 & 1 & 0 \\ 1 & 0 & 0 & 0 \end{pmatrix} \tag{7}$$

[Shuffle Matrix]

A shuffle matrix is defined as an (n+1)×(n+1) (row×column) matrix $$\{A_{\mu,\nu}\}(\mu,\nu=0,\ldots n)$$

where the components thereof form a substitution matrix of $$\{A_{i,j}\}(i, j=1, \ldots, n): n \times n \text{ (row} \times \text{column)}$$

$$A_{0,j}, A_{i,0}, A_{0,0} \in_R Z_q (i, j=1, \ldots, n)$$

[Certified Shuffle-decryption]

Figure 3:
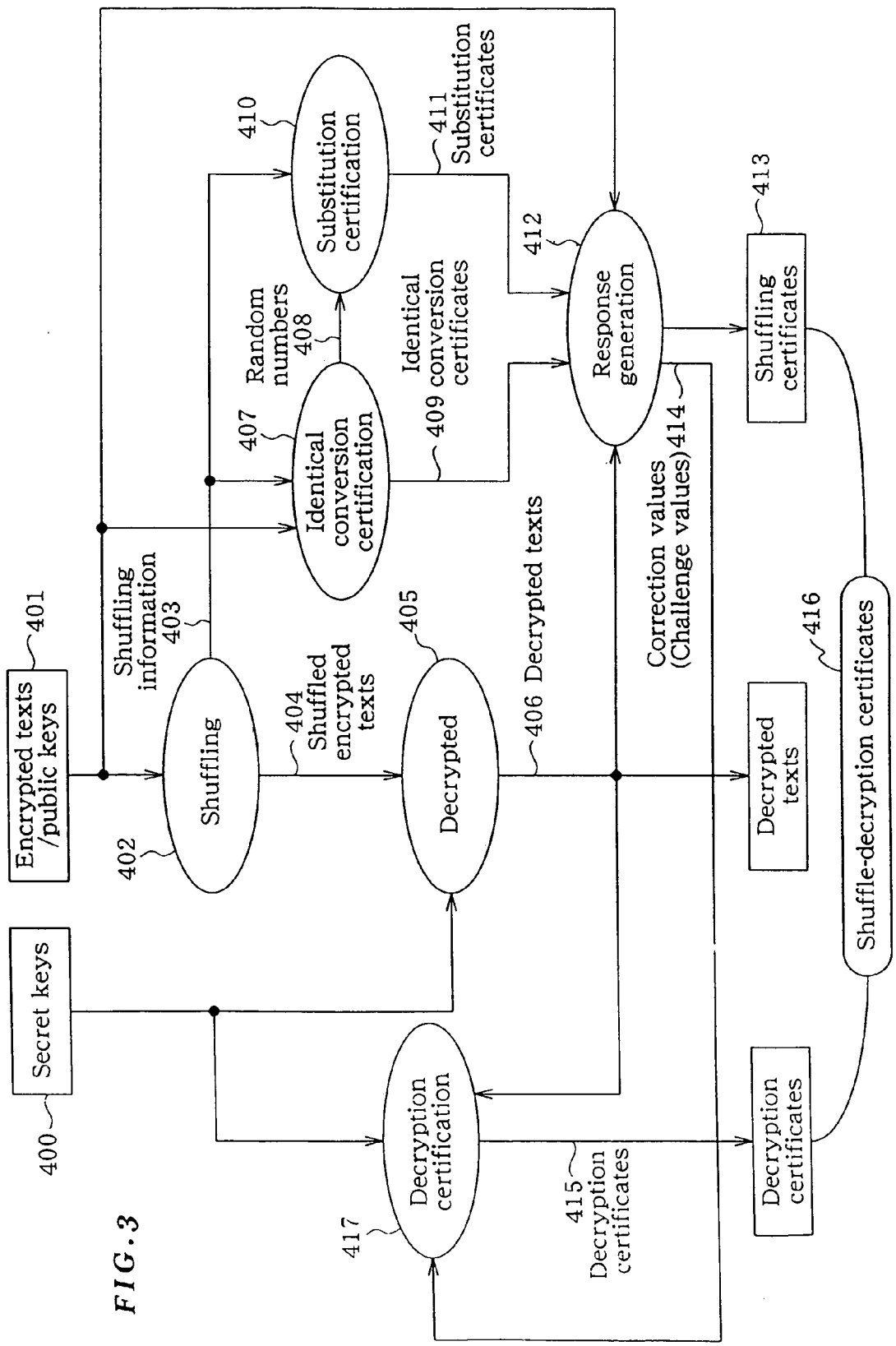
FIG. 3 is a diagram for illustrating certified shuffle-decryption according to one embodiment of the present invention.

Hereinafter, a certified shuffle-decrypting method according to one example of the invention will be described with reference to FIG. 3.

[Shuffling Step 402]
Encrypted texts/public keys 401

$$(g_i, m_i), (g_0, m_0): (i=1, \ldots, n)$$

are input.

Next, in shuffling step 402, shuffling information 403

$$A_{0,j}, \in_R Z_q (j=1, \ldots, n)$$

$A_{i,j}$: Substitution matrix (i,j=1, . . . ,n) is prepared.

Then, variables of the following Expression (8) as the shuffled encrypted texts 404 are calculated according to Equations (9) as follows. Then, the shuffling step 402 outputs the shuffling information 403 as well as the shuffled encrypted texts 404.

$$\bar{g}_i, \bar{m}_i) \; i=1, \ldots, n \tag{8}$$

$$\bar{g}_i = \prod_{v=0}^{n} g_v^{A_{vi}} \bmod p \; i=1, \ldots, n \tag{9}$$

$$\bar{m}_i = \prod_{v=0}^{n} m_v^{A_{vi}} \bmod p \; i=1, \ldots, n$$

[Decrypting Step 405]

The shuffled encrypted texts 404 and the secret keys 400 for decryption are input. Then, the decrypted texts 406 are calculated according to Equations (10) and output.

$$\tilde{g}_i = \bar{g}_i \bmod p \; i=1, \ldots, n$$

$$\tilde{m}_i = \bar{g}_i^{-x} \bar{m}_i \bmod p \; i=1, \ldots, n \tag{10}$$

[Identical Conversion Certifying Step 407]

The shuffling information 403 and the encrypted texts/public keys 401 are input. Then, a random number 408

$$A_{\mu,0} \in_R Z_q (\mu=0, \ldots, n)$$

is prepared to calculate each of the variables as a part of the commitment expressed by the following Expression (11) according to the following Equations (12) and to output the result as an identical conversion certificate 409.

$$(\tilde{g}_0, \tilde{m}_0) \tag{11}$$

$$\tilde{g}_0 = \prod_{v=0}^{n} g_v^{A_{v0}} \bmod p \tag{12}$$

$$\tilde{m}_0 = \prod_{v=0}^{n} m_v^{A_{v0}} \bmod p$$

[Substitution Certifying Step 410]

A shuffle matrix $$A_{\mu,\nu} \bmod q \; (\mu,\nu=0, \ldots, n)$$

which is obtained based on the shuffling information 403 generated in the shuffling step 402 and the random numbers 408 generated in the identical conversion certifying step 407 is input.

Then, random numbers (not 0 nor 1)

$$\sigma, \rho', \rho, \lambda_\mu \in_R Z_q (\mu=0, \ldots, n)$$

$$g = g_0$$

are prepared to calculate the following Equations (13)

$$\dot{\phi}_i = \sum_{j=1}^{n} (3A_{j0} + \rho'\lambda_j)A_{ji} \bmod q \; i=1, \ldots, n \tag{13}$$

$$\phi_i = \sum_{j=1}^{n} (3A_{j0} + 2\rho'\lambda_j)A_{j0}A_{ji} + \rho A_{0i} \bmod q \; i=1, \ldots, n$$

$$\phi_0 = \sum_{j=1}^{n} (A_{j0} + \rho'\lambda_j)A_{j0}A_{j0} + \rho'\lambda_0 + \rho A_{00} \bmod q$$

-continued $$\psi_i = \sum_{j=1}^{n} 2A_{j0}A_{ji} + \sigma A_{0i} \bmod q \quad i=1,\ldots,n$$

$$\psi_0 = \sum_{j=1}^{n} A_{j0}A_{j0} + \sigma A_{00} \bmod q$$

$$v = g^\rho, \; v' = g^{\rho'}, \; \dot{v}_0 = g^{\phi_0}, \; \dot{v}_i = g^{\phi_i},$$

$$w = g^\sigma, \; \dot{w}_0 = g^{\psi_0}, \; \dot{w}_i = g^{\psi_i},$$

$$\dot{u}_i = g^{\phi_i}, u_0 = g^{\lambda_0}, u_i = g^{\lambda_i} \bmod p \quad i=1,\ldots,n$$

Here, each of the variables represented as Expressions 14 is output as a substitution certificate 411.

$$v, \dot{v}_0, \dot{v}_i, w, \dot{w}_0, \dot{w}_i, v', \dot{u}_i, u_0, u_i, i=1,\ldots,n \quad (14)$$

[Response Generating Step 412]

The encrypted texts/public keys 401, the identical conversion certificates 409, the substitution certificates 411 and the decrypted texts 406 are input to calculate challenge value according to Equation (15).

$$c_i = H_i(g_0, g_j, m_0, m_j, \tilde{g}_0, \tilde{g}_j, \tilde{m}_0, \tilde{m}_j, v, \dot{v}_0, \dot{v}_j, w, \dot{w}_0, \dot{w}_j, v',$$
$$\dot{u}_j, u_0, u_j = 1,\ldots,n), i=1,\ldots,n \quad (15)$$

Then, responses are calculated according to Equations (16).

$$r_\mu = \sum_{\nu=0}^{n} A_{\mu\nu} c_\nu \bmod q \quad \mu = 0,\ldots,n \quad (16)$$

$$\lambda = \lambda_0 + \sum_{i=1}^{n} \lambda_i r_i r_i \bmod q$$

Finally, the identical conversion certificates, the substitution certificates and the responses are output as shuffling certificates 413.

[Decryption Certifying Step 417]

The decrypted texts 406, the secret keys 400 for decryption, and the challenge values 414 generated in the response generating step are input. An arbitrary value $$\beta \in_R \bmod q$$

is selected to calculate Equations (17).

$$\zeta = \prod_{i=1}^{n} \tilde{g}_i^{c_i} \bmod p \quad (17)$$

$$\eta = \zeta^{x'} \bmod p$$

$$\eta' = \zeta^\beta \bmod p$$

$$m''_0 = g_0^\beta \bmod p$$

Next, the challenge values for decryption certification are calculated according to Equation (18).

$$c' = H_0(\zeta, \eta, \eta', g_0, m'_0, m''_0) \quad (18)$$

Next, the responses for decryption certification are calculated as:

$$r' = c'x' + \beta \bmod q$$

Finally, $$\eta, \eta', m''_0, r'$$

are output as decryption certificates 415.

[Certificates]

The identical conversion certificates, the substitution certificates, the responses and the decryption certificates are output as certificates for shuffle-decryption.

[Verification of Shuffle-decryption]

Figure 4:
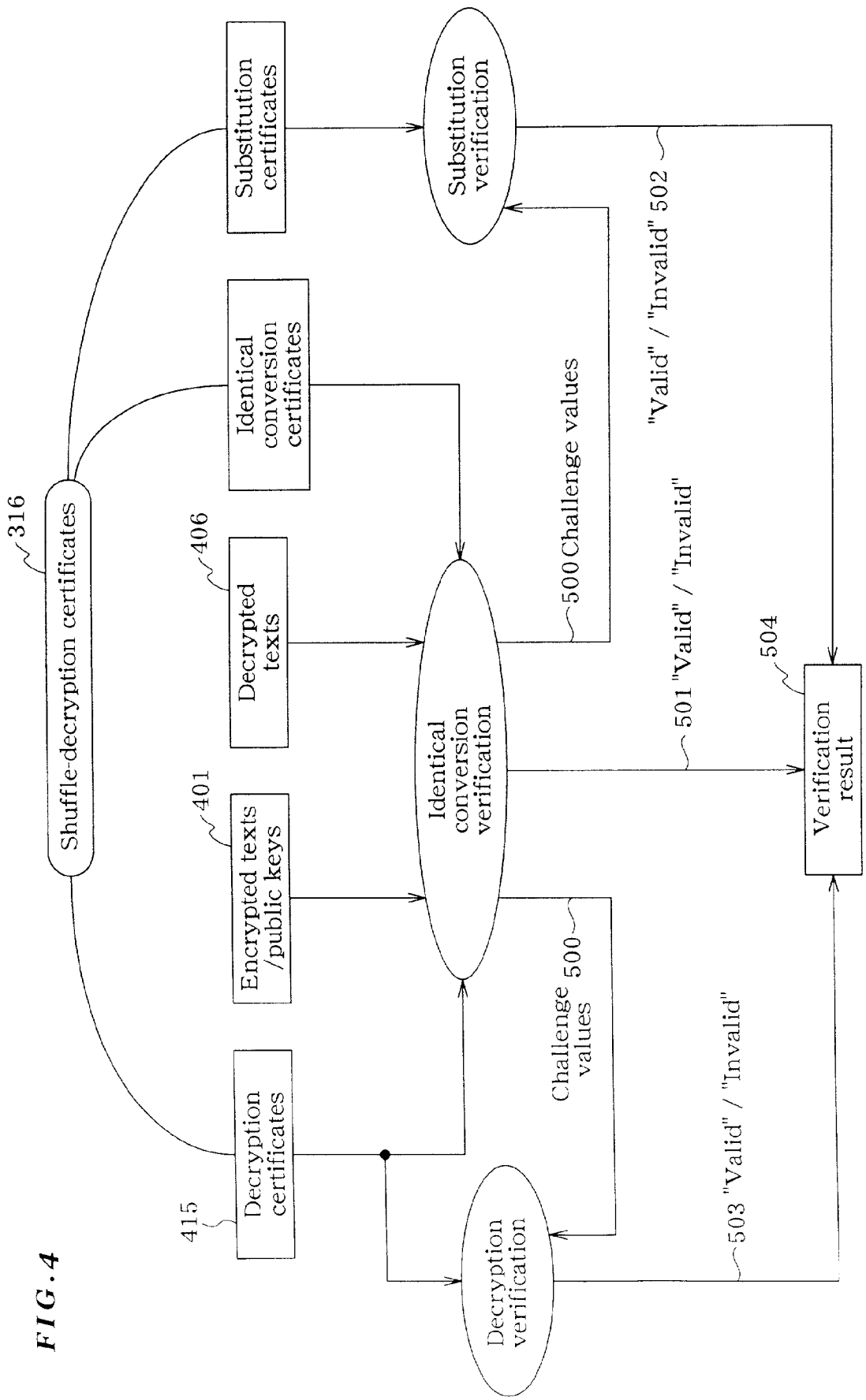
FIG. 4 is a diagram for illustrating shuffle-decryption verification according to one embodiment of the present invention.

Hereinafter, a method for verifying shuffle-decryption according to the present embodiment of the invention will be described with reference to FIG. 4.

[Identical Conversion Verifying Step]

The shuffle-decryption certificates 316, the encrypted texts/public keys 401 and the decrypted texts are input. Challenge values 500 are calculated according to the following Equation (19).

$$c_i = H_i(g_0, g_j, m_0, m_j, \tilde{g}_0, \tilde{g}_j, \tilde{m}_0, \tilde{m}_j, v, \dot{v}_0, \dot{v}_j, w, \dot{w}_0, \dot{w}_j, v',$$
$$\dot{u}_j, u_0, u_j = 1,\ldots,n), i=1,\ldots,n \quad (19)$$

Then, if the following Equations (20) are true then "valid", if not then "invalid" is output as an output 501.

$$\prod_{\mu=0}^{n} g_\mu^{r_\mu} = \prod_{\nu=0}^{n} \tilde{g}_\nu^{c_\nu} \bmod p \quad (20)$$

$$\prod_{\mu=0}^{n} m_\mu^{r_\mu} = \eta \prod_{\nu=0}^{n} \tilde{m}_\nu^{c_\nu} \bmod p$$

[Substitution Verifying Step]

The shuffle-decryption certificates and the challenge values 500 obtained in the identical conversion verifying step are input. Then, if the following Equations (21) are true, then "valid", if not, then "invalid" is output as an output 502.

$$u^\lambda = \dot{u}_0 \prod_{i=1}^{n} \dot{u}_i^{r_i r_i} \bmod p \quad (21)$$

$$v'^\lambda v_g^{r_0} \sum_{i=1}^{n} (r_i^3 - c_i^3) = \dot{v}_0 \prod_{i=1}^{n} \dot{u}_i^{c_i^2} \prod_{i=1}^{n} \dot{v}_i^{c_i} \bmod p$$

$$w^{r_0} g \sum_{i=1}^{n} (r_i^2 - c_i^2) = \dot{w}_0 \prod_{i=0}^{n} \dot{w}_i^{c_i} \bmod p$$

[Decryption Verifying Step]

The shuffle-decryption certificates and the challenge values 500 obtained in the identical conversion verifying step are input. Then, the auxiliary challenge values are calculated according to the following Equation (22).

$$c' = H_0(\zeta, \eta, \eta', g_0, m'_0, m''_0) \quad (22)$$

Next, if the following Equations (23) are true then "valid", if not then "invalid" is output as an output 503.

$$g_0^{r'} = m_0'^{c'} m''_0 \bmod p \quad (23)$$

$$\left( \prod_{i=1}^{n} \tilde{g}_i^{c_i} \right)^{r'} = \eta^{c'} \eta' \bmod p$$

If all of the outputs in the identical conversion verifying step, the substitution verifying step and the decryption verifying step are valid then "valid", if any one of them is invalid then "invalid" is output as a shuffle-decryption verification output 504.

In the certified shuffle-decrypting system according to the present embodiment, functions of the shuffling unit 11, the decrypting unit 12, the certifying unit 13, the identical conversion certifying unit 13-1, the substitution certifying unit 13-2, the response generating unit 13-3 and the decryption certifying unit 13-4 of the certified shuffle-decryption device 10, functions of the identical conversion verifying unit 21, the substitution verifying unit 22 and the decryption verifying unit 23 of the shuffle-decryption verification device 20, and other functions may also be realized as a hardware. Computer programs provided with the above-mentioned functions, namely a certified shuffle-decryption program and a shuffle-decryption verification program, can also be realized by being loaded to a memory of a computer processor. The certified shuffle-decryption program and the shuffle-decryption verification program may be stored in a magnetic disk, a semiconductor memory or other storage media 80 and 90 to be loaded to the computer processor to control the operations thereof, thereby realizing the above-mentioned functions.

The present invention has been described by way of preferred embodiments and examples. The present invention, however, is not limited to the above-described embodiments or examples and may be modified in various ways without departing from the scope of the technical spirit of the invention.

According to the present invention, an amount of calculation required for a combination of certified decryption and certified shuffling can greatly be minimized compared to conventional techniques.

For example, assume that the number of the input encrypted texts is n. When the certified decryption is combined with the certified shuffling according to the conventional technique of Document 2, 3n number of modular exponentiations are required. On the other hand, the present invention requires only (n+3) number of modular exponentiations, which is far less than the amount of calculation required by the conventional techniques.

Since the modular exponentiations according to the present invention are not performed individually but are carried out as a multiplication of the modular exponentiations, much less amount of calculation is required and thus further high-speed processing can be realized.

The invention may be embodied in other specific forms without departing from the spirit or essential characteristic thereof. The present embodiments are therefore to be considered in all respects as illustrative and not restrictive, the scope of the invention being indicated by the appended Claims rather than by the foregoing description and all changes which come within the meaning and range of equivalency of the Claims are therefore intended to be embraced therein.

The entire disclosure of Japanese Patent Application No. 2001-149331 (Filed on May 18, 2001) including specification, claims, drawings and summary are incorporated herein by reference in its entirety.

What is to be claimed:

1. A certified shuffle-decryption device for shuffle-decrypting multiple encrypted texts to generate shuffle-decrypted texts and for generating shuffle-decryption certificates for certifying that the shuffle-decryption has correctly taken place, comprising:

a shuffling unit into which the multiple encrypted texts and the public keys are input and which shuffles the order of the multiple encrypted texts and encrypts them with the public keys, thereby generating multiple shuffled encrypted texts;

a decrypting unit into which the multiple shuffled encrypted texts and secret keys are input and which decrypts the shuffled encrypted texts with the secret keys, thereby generating multiple shuffle-decrypted texts;

an identical conversion certifying unit which generates a certificate certifying that it knows the ordering relationship among the encrypted texts before and after the shuffling as well as random numbers used for encryption, and when each of the input encrypted texts consists of multiple integer elements, that it knows that the elements of each encrypted text have been shuffled in the same order and converted with the same random numbers;

a substitution certifying unit which generates a certificate certifying that the input encrypted texts have been correctly shuffled;

a response generating unit which generates responses for the identical conversion certifying unit and the substitution certifying unit; and a decryption certifying unit which generates, based on the responses, a certificate certifying that the shuffle-decrypted texts are obtained through correct decryption of the shuffled encrypted texts using the secret keys, and wherein the identical conversion certificates, the substitution certificates and the responses are output as a shuffling certificate, and the certificates generated by the identical conversion certifying unit, the substitution certifying unit and the decryption certifying unit us well as the responses generated by the response generating unit are output as the shuffle-decryption certificates.

2. The certified shuffle-decryption device according to claim 1, wherein the identical conversion certifying unit generates and transmits a commitment, receives a challenge and generates and transmits a response, wherein the identical conversion certifying unit generates the commitment using the inputted encrypted texts string, a value corresponding to shuffle as information of shuffle-decryption and random numbers, wherein the substitution certifying unit generates and transmits a commitment, receives a challenge and generates and transmits a response, wherein the substitution certifying unit generates the response of the identical conversion certifying unit and the substitution certifying unit from the information of shuffle-decryption and the challenge, and wherein the response, the challenge and the commitment satisfy a cubic polynomial.

3. The certified shuffle-decryption device according to claim 2, wherein the third term of the cubic polynomial comprises a sum of the challenge cubed and a sum of the response of the identical conversion certifying unit.

4. A shuffle-decryption verification device for verifying whether or not shuffle-decryption of multiple encrypted texts has taken place correctly by referring to shuffle-decryption certificates certifying that the shuffle-decryption has taken place correctly, comprising:

an identical conversion verifying unit;

a substitution verifying unit;

a decryption verifying unit; and wherein the shuffle-decryption certification comprise:

responses as references upon certification; and certificates generated based on the responses certifying that the shuffled encrypted texts, obtained by shuffling the order of the encrypted texts and encrypting them with public keys, have correctly been decrypted with secret keys to give the shuffle-decrypted texts, wherein the identical conversion verifying unit takes in the shuffle-decryption certificates, the encrypted texts, the public keys and the shuffle-decrypted texts as input, and which verifies whether or not a generator of the certificates has information of the shuffling order and the content of conversion of the encrypted texts, generates challenge values, and when each of the input encrypted texts consist of a plurality of integer elements, verifies whether or not the elements of each encrypted texts have been converted with the same random numbers;

wherein the substitution verifying unit takes in the shuffle-decryption certificates and the challenge values generated by the identical conversion verifying unit as input, and which verifies whether or not the encrypted texts have been correctly shuffled; and wherein the decryption verifying unit takes in the shuffle-decryption certificates and the challenge values generated by the identical conversion verifying unit as input, and which verifies whether or not the shuffled encrypted texts have been correctly decrypted using the secret keys to give shuffle-decrypted texts, and wherein only when judged "valid" in all of the identical conversion verifying unit, the substitution verifying unit and the decryption verifying unit, the encrypted texts are judged to have been shuffle-decrypted correctly.

5. The shuffle-decryption verification device according to claim 4, wherein the identical conversion verifying unit receives a commitment, generates and transmits a challenge receives a response and verifyies the response, wherein the substitution verifying unit receives a commitment, generates and transmits a challenge and receives a response, and wherein the units verify that the response, the commitment and the challenge satisfy a cubic polynomial.

6. The certified shuffle-decryption verification device according to claim 5, wherein a third term or the cubic polynomial comprises a sum of the challenge cubed and a sum of the response of the identical conversion certifying unit.

7. A certified shuffle-decrypting method for shuffle-decrypting multiple encrypted texts to generate shuffle-decrypted texts and for generating shuffle-decryption certificates for certifying that the shuffle-decryption has correctly taken place, comprising:

shuffling the order of the encrypted texts and encrypting with public keys to obtain shuffled encrypted texts, wherein the shuffling the order of the encrypted texts and encrypting with the public keys are based on inputs of the multiple encrypted texts, thereby generating multiple shuffled encrypted texts;

decrypting with secret keys to obtain the shuffle-decrypted texts, wherein the decrypting with the secret keys is based on inputs of the multiple shuffled encrypted texts, thereby generating multiple shuffle-decrypted texts;

generating an identical conversion certificate certifying that it knows the ordering relationship among the encrypted texts before and after the shuffling as well as random numbers used for encryption, and when each of the input encrypted texts consists of multiple elements, that it knows that the elements of each encrypted text have been shuffled in the same order and converted with the same random numbers;

generating a substitution certificate certifying that the input encrypted texts have been correctly shuffled;

generating responses based on the identical conversion certificate and the substitution certification; and generating a decryption certificate, based on the responses, certifying that the shuffle-decrypted texts are obtained through correct decryption of the shuffled encrypted texts using the secret keys, wherein the identical conversion certificates, the substitution certificates and the responses are output as a shuffling certificate, and the identical conversion certificate, the substitution certificate and the decryption certificate as well as the responses generated are output as the shuffle-decryption certificates.

8. A shuffle-decryption verifying method for verifying whether or not shuffle-decryption of multiple encrypted texts has taken place correctly by referring to shuffle-decryption certificates certifying that the shuffle-decryption has taken place correctly, an identical conversion verifying step;

a substitution verifying step;

a decryption verifying step;

wherein the shuffle-decryption certificates comprise:

responses as references upon certification; and certificates, generated based on the responses, certifying that the shuffled encrypted texts, obtained by shuffling the order of the encrypted texts and encrypting them with public keys, have correctly been decrypted with secret keys to give the shuffle-decrypted texts;

wherein the identical conversion verifying step takes in the shuffle-decryption certificates, the encrypted texts, the public keys and the shuffle-decrypted texts as input, where it is verified whether or not a generator of the certificates has information of the shuffling order and the content of conversion of the encrypted texts, where challenge values are generated, and when each of the input encrypted texts consists of a plurality of elements, it is verified whether or not the elements of each encrypted text have been shuffled in the same order and converted with the same random numbers;

wherein the substitution verifying step takes in the shuffle-decryption certificates and the challenge values generated by the identical conversion verifying step as input, and where it is verified whether or not the encrypted texts have been correctly shuffled; and wherein the decryption verifying step takes in the shuffle-decryption certificates and the challenge values generated by the identical conversion verifying step as input, and where it is verified whether or not the shuffled encrypted texts have been correctly decrypted using the secret keys to give shuffle-decrypted texts, and wherein only when judged "valid" in all of the identical conversion verifying step, the substitution verifying step and the decryption verifying step, the encrypted texts are judged to have been shuffle-decrypted correctly.

9. A certified shuffle-decrypting system For generating shuffle-decryption certificate certifying that multiple encrypted texts have been shuffle-decrypted correctly, and for verifying, based on the shuffle-decryption certificates, whether or not the shuffle-decryption has taken place correctly, comprising:

a certified shuffle-decryption device for shuffle-decrypting the multiple encrypted texts to generate the shuffle-decrypted texts, and for generating the shuffle-decryption certificates; and a shuffle-decryption verification device for verifying whether or not the shuffle-decryption has taken place correctly, by referring to the generated shuffle-decrypted texts and the shuffle-decryption certificates for the shuffle-decrypted texts, and wherein the certified shuffle-decryption device further comprises:

a shuffling unit into which the multiple encrypted texts and the public keys are input and which shuffles the order of the multiple encrypted texts and encrypts them with the public keys, thereby generating multiple shuffled encrypted texts;

a decrypting unit into which the multiple shuffled encrypted texts and secret keys are input and which decrypts the shuffled encrypted texts with the secret keys, thereby generating multiple shuffle-decrypted texts; and a certifying unit into which the multiple encrypted texts, the public keys and the secret keys are input and which generates the shuffle-decryption certificates, wherein the certifying unit of the certified shuffle-decryption device further comprises:

an identical conversion certifying unit which generates a certificate certifying that it knows the ordering relationship among the encrypted texts before and after the shuffling as well as random numbers used for encryption, and when each of the input encrypted texts consists of multiple integer elements, that it knows that the elements of each encrypted text have been shuffled in the same order with the same random numbers;

a substitution certifying unit which generates a certificate certifying that the input encrypted texts have been correctly shuffled;

a response generating unit which generates responses for the identical conversion certifying unit and the substitution certifying unit; and a decryption certifying unit which generates, based on the responses, a certificate certifying that the shuffle-decrypted texts are obtained through correct decryption of the shuffled encrypted texts using the secret keys, and wherein the identical conversion certificates, the substitution certificates and the responses are output as a shuffling certificate, and the certificates generated by the identical conversion certifying unit, the substitution certifying unit and the decryption certifying unit us well as the responses generated by the response generating unit are output as the shuffle-decryption certificates.

10. A certified shuffle-decrypting system according to claim 9, wherein the shuffle-decryption verification device further comprises:

an identical conversion verifying unit into which the shuffle-decryption certificates, the encrypted texts, the public keys and the shuffle-decrypted texts are input, and which verifies whether or not a generator of the certificates has information of the shuffling order and the content of conversion of the encrypted texts, generates challenge values, and when each of the input encrypted texts consists of a plurality of elements, verifies whether or not the elements of each encrypted texts have been shuffled in the same order and converted with the same random numbers;

a substitution verifying unit into which the shuffle-decryption certificates and the challenge values generated by the identical conversion verifying unit are input, and which verifies whether or not the encrypted texts have been correctly shuffled; and a decryption verifying unit into which the shuffle-decryption certificates and the challenge values generated by the identical conversion verifying unit are input, and which verifies whether or not the shuffled encrypted texts have been correctly decrypted using the secret keys to give shuffle-decrypted texts, and wherein only when judged "valid" in all of the identical conversion verifying unit, the substitution verifying unit and the decryption verifying unit, the encrypted texts are judged to have been shuffle-decrypted correctly.

11. A computer program product including a computer readable medium, the computer readable medium comprising instructions for implementing processes for certified shuffle-decrypting which controls a computer for shuffle-decrypting multiple encrypted texts to generate shuffle-decrypted texts and for generating shuffle-decryption certificates for certifying that the shuffle-decryption has correctly taken place, in a computer, said processes including:

a shuffling process where the multiple encrypted texts and the public keys are input and where the order of the multiple encrypted texts are shuffled and encrypted with the public keys, thereby generating multiple shuffled encrypted texts;

a decrypting process where the multiple shuffled encrypted texts and the secret keys are input and where the shuffled encrypted texts are decrypted with the secret keys, thereby generating multiple shuffle-decrypted texts; and an identical conversion certifying process which generates a certificate certifying that it knows the ordering relationship among the encrypted texts before and after the shuffling as well as random numbers used for encryption, and when each of the input encrypted texts consists of multiple elements, that it knows that the elements of each encrypted texts have been shuffled in the same order with the same random numbers;

a substitution certifying process which generates a certificate certifying that the input encrypted texts have been correctly shuffled;

a response generating process which generates responses for the identical conversion certifying process and the substitution certifying process; and a decryption certifying process which generates, based on the responses, a certificate certifying that the shuffle-decrypted texts arc obtained through correct decryption of the shuffled encrypted texts using the secret keys, and wherein the identical conversion certificates, the substitution certificates and die responses are output as a shuffling certificate, and the certificates generated through the identical conversion certifying process, the substitution certifying process and the decryption certifying process as well as the responses generated by the response generating process are output as the shuffle-decryption certificates.

12. A computer program product including a computer readable medium, the computer readable medium comprising instructions for implementing processes for shuffle-decryption verifying which controls a computer for verifying whether or not shuffle-decryption of multiple encrypted texts has taken place correctly hy referring to shuffle-decryption certificates certifying that the shuffle-decryption has taken place correctly in a computer, said processes including:
- an identical conversion verifying process;
- a substitution verifying process;
- a decryption verifying process; and
- wherein the shuffle-decryption certificates comprise;
- responses as references upon certification; and
- certificates, generated based on the responses certifying that the shuffled encrypted texts, obtained by shuffling the order of the encrypted texts and encrypting them with public keys, have correctly been decrypted with secret keys to give the shuffled-decrypted texts,
- wherein the identical conversion verifying process takes in the shuffle-decryption certificates, the encrypted texts, the public keys and the shuffle-decrypted texts as input, where it is verified whether or not a generator of the certificates has information of the shuffling order and the contract of conversion of the encrypted texts, where challenge values are generated, and when each of the input encrypted texts consists of a plurality of elements, it is verified whether or not the elements of each encrypted texts have been shuffled in the same order and converted with the same random numbers so as the whole conversion to be encryptions;
- wherein the substitution verifying process takes in the shuffle-decryption certificates and the challenge values generated by the identical conversion verifying process as input, and where it is verified whether or not the encrypted texts have been correctly shuffled; and
- wherein the decryption verifying process takes in the shuffle-decryption certificates and the challenge values generated by the identical conversion verifying process as input, and where it is verified whether or not the shuffled encrypted texts have been correctly decrypted using the secret keys to give shuffle-decrypted texts, and
- wherein only when judged "valid" in all of the identical conversion verifying process, the substitution verifying process and the decryption verifying process, the encrypted texts arc judged to have been shuffle-decrypted correctly.

* * * * *